United States Patent [19]
Itoh et al.

[11] Patent Number: 5,542,514
[45] Date of Patent: Aug. 6, 1996

[54] ROTATIONAL TRANSMISSION DEVICE

[75] Inventors: Kenichiro Itoh, Iwata-gun; Kenro Adachi, Iwata, both of Japan

[73] Assignee: NTN Corporation, Osaka, Japan

[21] Appl. No.: 253,560

[22] Filed: Jun. 3, 1994

[30] Foreign Application Priority Data

Jun. 10, 1993 [JP] Japan ................................. 5-138237
Jun. 10, 1993 [JP] Japan ................................. 5-138299

[51] Int. Cl.$^6$ ................................................. F16D 47/04
[52] U.S. Cl. ........................ 192/40; 192/45.1; 192/48.2; 192/48.6; 192/48.92
[58] Field of Search ............................... 192/48.2, 48.6, 192/48.92, 35, 40, 43, 45.1, 48.4; 180/247, 248, 249

[56] References Cited

U.S. PATENT DOCUMENTS

| | | | |
|---|---|---|---|
| 1,934,270 | 11/1933 | Maynard | 192/48.6 |
| 2,591,989 | 4/1952 | Winther | 192/84 B X |
| 2,672,965 | 3/1954 | Miller | 192/84 B X |
| 4,694,943 | 9/1987 | Petrak | 192/40 X |
| 4,787,491 | 11/1988 | Kato | 192/48.6 |
| 5,355,748 | 10/1994 | Ito et al. | 180/248 X |

FOREIGN PATENT DOCUMENTS

| | | | |
|---|---|---|---|
| 436270A1 | 7/1991 | European Pat. Off. . | |
| 5-118358 | 5/1993 | Japan | 192/45.1 |
| 5-118359 | 5/1993 | Japan | 192/45.1 |
| 5-149351 | 6/1993 | Japan | 192/48.6 |
| 6-17853 | 1/1994 | Japan | 192/48.92 |
| 6-33957 | 2/1994 | Japan | 192/48.92 |
| 6-26533 | 2/1994 | Japan | 192/48.92 |

*Primary Examiner*—Rodney H. Bonck
*Attorney, Agent, or Firm*—Nikaido, Marmelstein, Murray & Oram LLP

[57] ABSTRACT

A rotation transmission device which has a driving member, a driven member, engaging elements mounted between them, and a device for mechanically changing over the transmission and cut-off of turning effort and which restricts the operation of the changeover device as necessary. Between the outer ring as a driven member and the inner member as a driving member, a retainer holding the sprags spaced from one another is mounted. In the inner member are housed a solenoid and a coupling member engaging the outer ring. The solenoid is actuated by contact of a brush against a slip ring, so that the coupling member couples the outer ring with the inner member, thus causing the sprags to be inoperative.

7 Claims, 12 Drawing Sheets

5,542,514

ROTATIONAL TRANSMISSION DEVICE

This invention relates to a rotation transmission device mounted on the driving system of a vehicle to selectively transmit and cut off the driving force.

A viscous coupling is known as a device used to transmit the driving force from the engine of a car to the front wheels or rear wheels. While the vehicle is making a sharp turn at low speed, the viscous coupling tends to produce dragging torque due to the characteristics of the high-viscosity fluid contained therein. In order to transmit a large driving force, its coupling diameter has to be large. This increases the size of the entire device.

Also, there is known a rotation transmission device which uses a mechanical clutch to change over the transmission of the driving force to the front wheels and the rear wheels for efficient transmission even while the vehicle speed is relatively low.

Such a device includes a driving member and a driven member rotatably mounted one on the other, engaging elements mounted between the driving member and the driven member and adapted to engage them to couple them together when they rotate relative to each other, and a retainer member mounted between them to keep the engaging elements apart from one another and control the movement of the engaging elements.

It is mounted on the driving path of a four-wheel drive vehicle as shown in FIG. 6, with the driving member coupled to a propeller shaft B branching from the transfer and the driven member coupled to a front differential C. This arrangement makes it possible to instantly change over the connection between the front wheels and the rear wheels, thereby automatically changing over between the 2-wheel drive and 4-wheel drive.

This conventional device, however, has a problem in that, when the driven member begins to rotate freely relative to the engaging elements while the vehicle is moving straight or turning a corner, the front wheels are completely separated from the driving system. In this state, no turning torque is transmitted from the front wheels to the driving system.

Thus, while the vehicle is moving with the engine brake being applied, the engine brake is applied only to the rear wheels because the torque is not transmitted from the front wheels to the driving system. Thus, it is impossible to increase the engine force.

It is an object of this invention to provide a rotation transmission device which is free of the above problem and which allows a driver to limit the function of the mechanical clutch when large braking force is needed.

In order to attain this object, according to this invention, there is provided a rotation transmission device comprising a driving member and a driven member rotationally mounted one around the other, a plurality of engaging elements disposed between the driving member and the driven member and adapted to engage the driving member and the driven member to couple them together when they rotate in either direction, a retainer member mounted between the driving member and the driven member for keeping the engaging elements circumferentially spaced apart by a predetermined distance from one another, the retainer member and the driving member being coupled together so as to be rotatable relative to each other with a play left therebetween, two rotational resistance imparting means coupled to the retainer member for imparting a rotational resistance to the retainer member from opposite directions, a changeover means coupled to the retainer member for imparting the rotational resistance from one of the two rotational resistance imparting means to the retainer member while the driving member is rotating in one direction and imparting the rotational resistance from the other of the two rotational resistance imparting means to the retainer member while the driving member is rotating in the opposite direction, and a coupling means mounted on the driven member for selectively coupling and disconnecting the driven member to and from one of the driving member and the retainer member.

While the driving member and the driven member are separated from each other, the engaging elements become freely movable, so that the driven member can rotate freely relative to the engaging elements.

While the driving member and the driven member are coupled together through the coupling means, the driving force transmission path is directly connected with the engaging elements locked in position. In this state, the engaging elements lose their function as a clutch for selectively transmitting and cutting off the turning torque.

While the retainer member and the driven member are coupled together through the coupling means, the retainer is rotated together with the driven member when the latter rotates in the overrunning direction. This changes the direction in which the engaging elements engage, so that the mechanical clutch is actuated in its engaging direction. Driving force is thus transmitted.

According to this invention, it is possible to restrict the function as the mechanical clutch by coupling the driven member to the driving member or to the retainer according to the state of use. If this device is used on a four-wheel drive vehicle, it is possible to change over the driving mode properly according the travelling condition and also to increase the effect of the engine brake.

Other features and objects of the present invention will become apparent from the following description made with reference to the accompanying drawings, in which:

FIGS. 1 to 4 show the rotation transmission device of the first embodiment.

Figure 1:
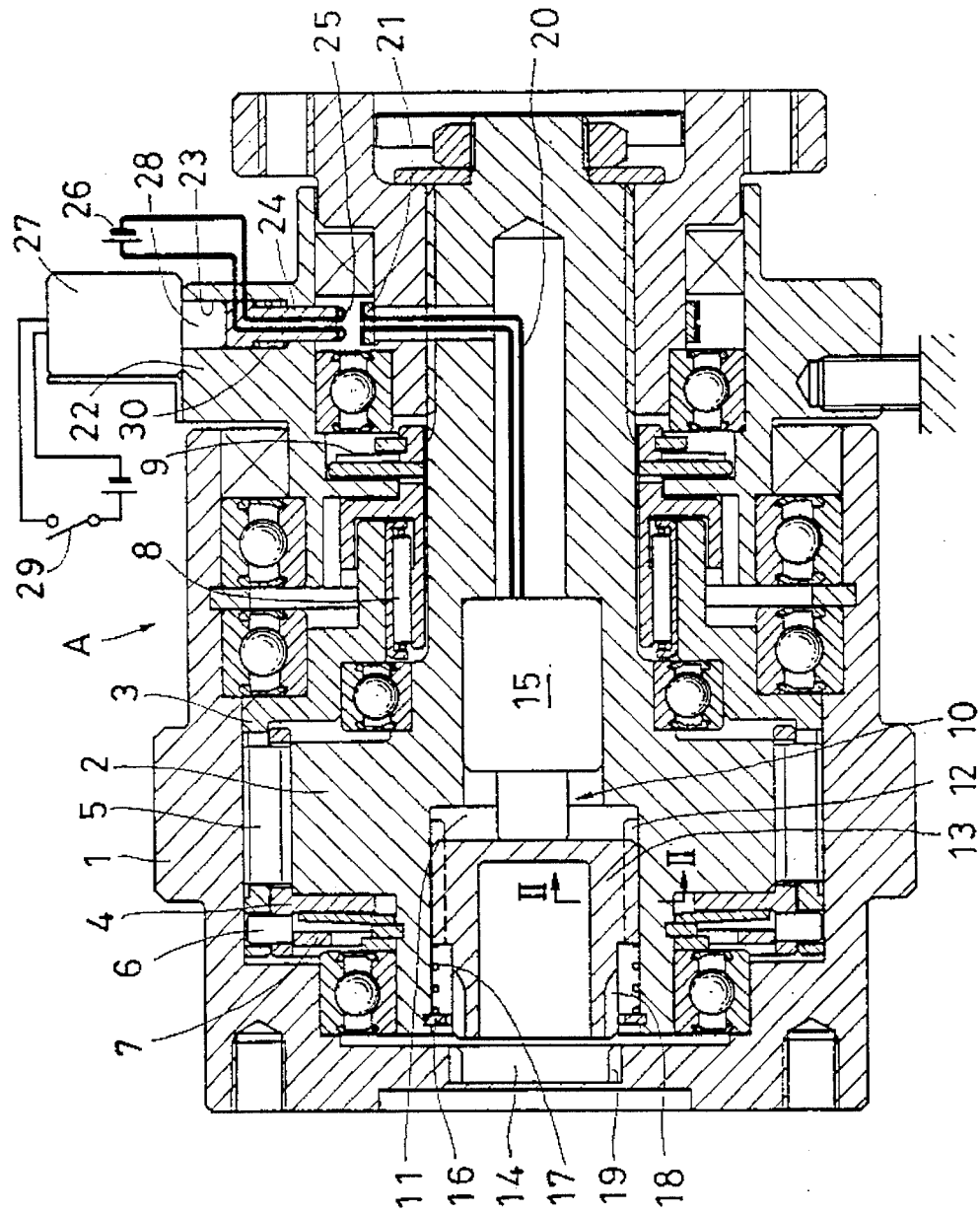
FIG. 1 is a vertical sectional front view of a first embodiment.
Figure 2:
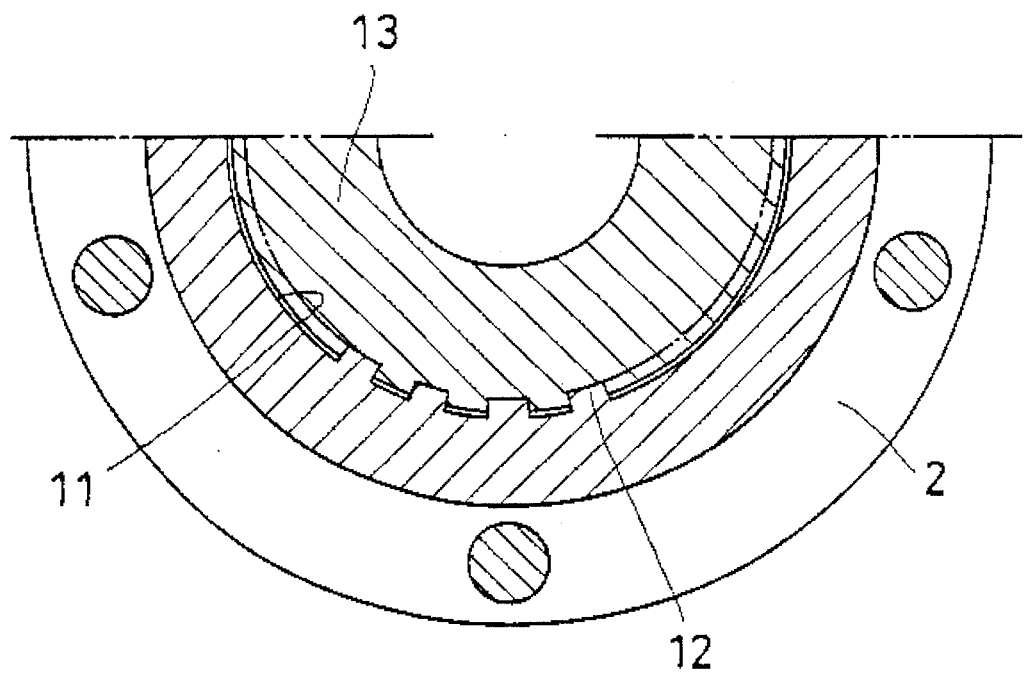
FIG. 2 is a sectional view taken along line II—II of FIG. 1.

As shown in FIGS. 1 and 2, this device has an outer ring 1 as a driven member and an inner member 2 as a driving member. They are mounted one on the other so as to be rotatable relative to each other. Between the outer ring 1 and the inner member 2 are mounted a large-diameter retainer 3 and a small-diameter retainer 4 that are formed with pockets in which are received sprags 5 as engaging elements through which the outer ring 1 and the inner member 2 are adapted to engage together.

The small-diameter retainer 4 is secured to the inner member 2 through its bent portion radially extending.

The large-diameter retainer 3 is coupled to the inner member 2 through pins 6 with gaps formed therebetween in the direction of rotation. A switch spring 7 is mounted to one end of the large-diameter retainer 3 to impart a rotational resistance to the retainer 3 from one direction.

To the other end of the large-diameter retainer 3 is coupled through a one-way clutch 8 a rotational resistance imparting means 9 for producing a rotational resistance that is opposite in direction to the rotational resistance produced by the switch spring 7. The rotational resistance produced by the rotational resistance imparting means 9 is set to be larger than the turning effort imparted by the switch spring 7.

The one-way clutch 8 serves to change over the coupling between the large-diameter retainer 3 and the rotational resistance imparting means 9. According to the direction of rotation of the inner member 2 and thus the large-diameter retainer 3, the one-way clutch 8 selectively engages and disengages the rotational resistance imparting means 9 with and from the large-diameter retainer 3.

As shown in FIG. 1, in this embodiment, a coupling means 10 is provided between the outer ring 1 as the driven member and the inner member 2 as the driving member to selectively connect and disconnect the outer ring 1 and the inner member 2.

The coupling means 10 comprises a coupling member 13 slidably mounted in a bore 11 formed in the inner member 2 and coupled to the inner member through a spline 12, and a solenoid 15 mounted in a deeper part of the bore 11 for moving the coupling member 13 toward a hole 14 formed in the bottom wall of the outer ring 1. It also has an elastic member 17 disposed between a snap ring 16 mounted in the bore 11 and the coupling member 13 to urge the coupling member 13 away from the bottom hole 14 of the outer ring 1.

Figure 4:
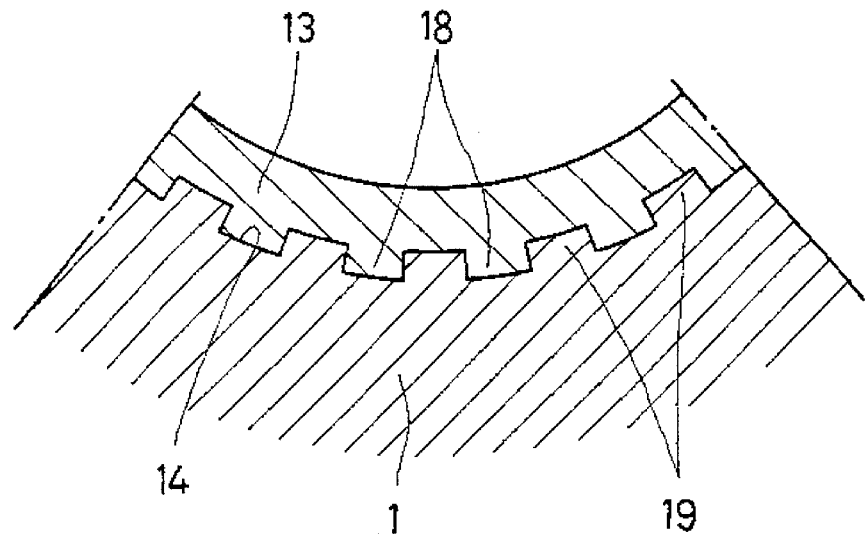
FIG. 4 is a sectional view taken along line IV—IV of FIG. 3.

As shown in FIG. 4, engaging teeth 18 and 19 are formed on the outer peripheral surface of the coupling member 13 and on the inner peripheral surface of the outer ring 1, respectively. They are adapted to mesh with each other when the member 13 and the outer ring 1 move close to each other. The outer ring 1 and the inner member 2 are coupled together through the engagement between the teeth 18 and 19 while the coupling member 13 and the inner member 2 are coupled together through a spline.

Lead wires 20 extend from the solenoid 15 through the bore 11 and connected to a slip ring 21 mounted on the outer periphery of the inner member 2.

On the other hand, a housing 22 is mounted around the inner member 2 to be secured to the vehicle body. It is formed with a radial hole 23 extending toward the slip ring 21. Fitted in the hole 23 is a presser member 24 movable toward and away from the slip ring 21. A brush 25 as an electric contact is mounted to the tip of the presser member 24 and connected to a DC power supply 26 such as a battery.

Also fitted in the hole 23 is an actuator shaft 28 of an external solenoid 27 fixed to the outer surface of the housing 22. By turning on a switch 29 of a power circuit for the external solenoid 27, the actuator shaft 28 will be stretched until the presser member 24 is pushed into contact with the slip ring 21.

In the hole 23 is also mounted an elastic member 30 that urges the presser member 24 outwardly. When the actuator shaft 28 of the external solenoid 27 retracts, the presser member 24 will move outward biased by the elastic member 30, separating the brush 25 and the slip ring 21 from each other.

Figure 5:
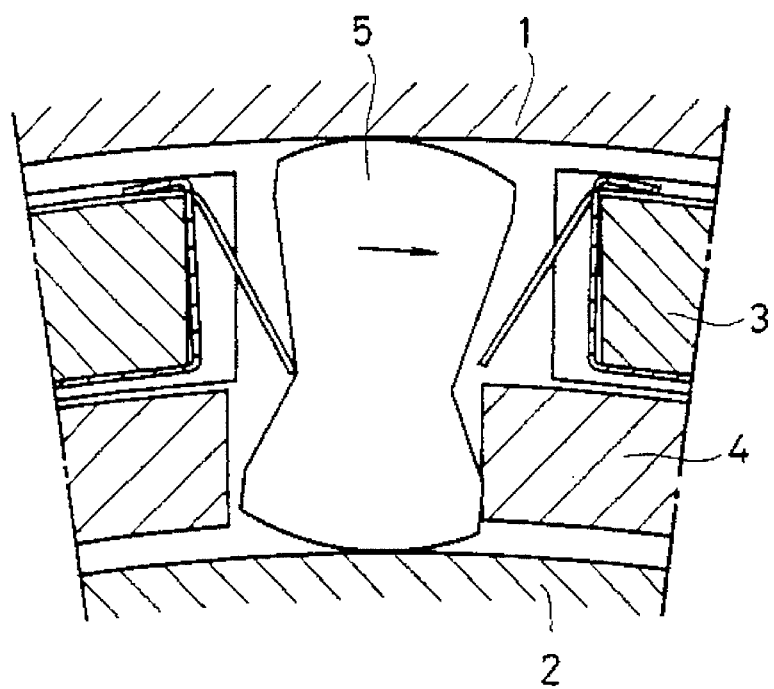
FIG. 5 is a sectional view of a sprag in its engageable position.
Figure 6:
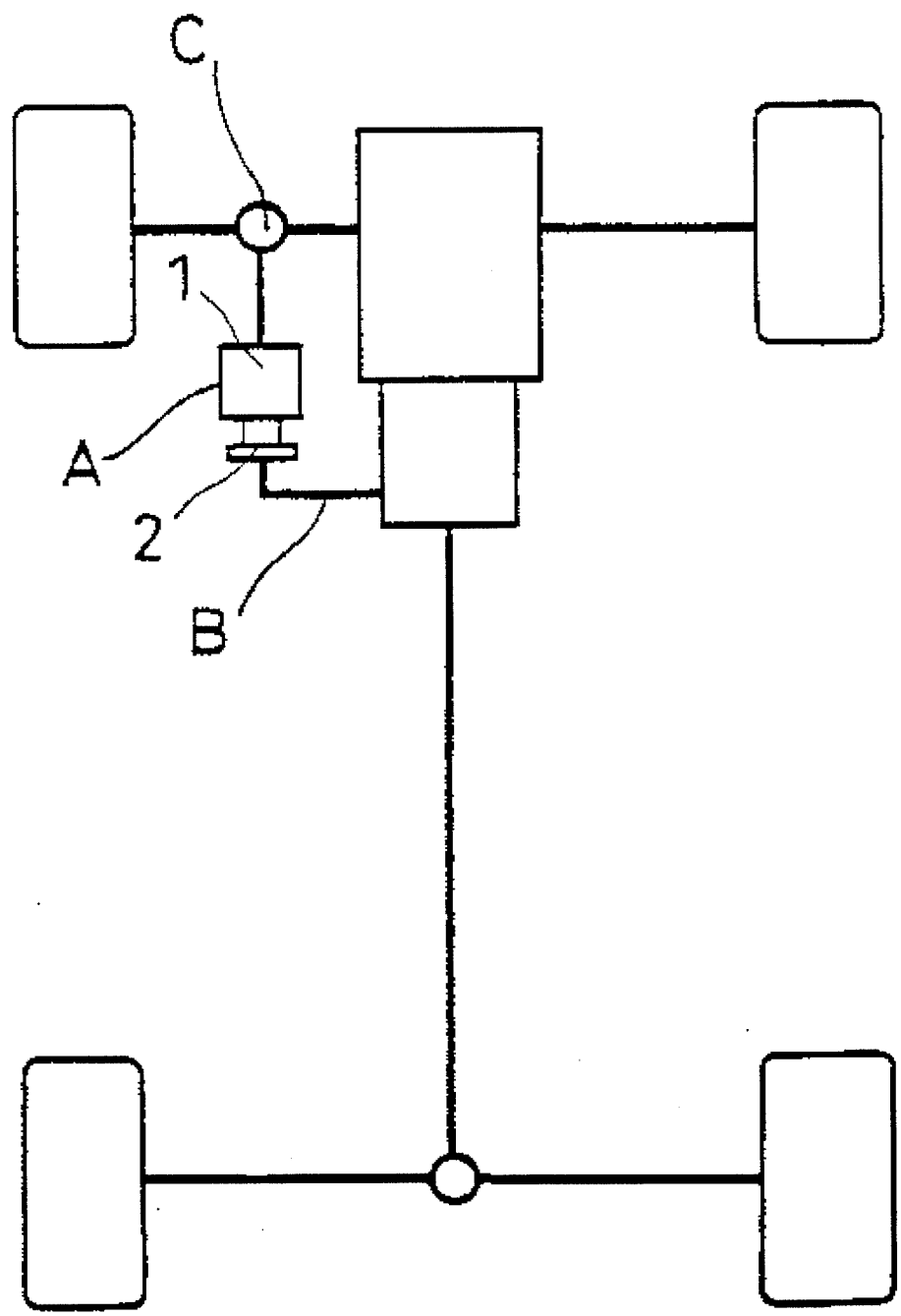
FIG. 6 is a diagrammatic view showing the same as mounted on the driving system of a vehicle.

As shown in FIG. 6, this rotation transmission device A is mounted on the driving system of a vehicle by coupling the inner member 2 to a front wheel propeller shaft B branching from the transfer and the outer ring 1 to the front differential C. When the vehicle is moved backward with the device A mounted thereon, the rotation of the large-diameter retainer 3 will be delayed with respect to the inner member 2 because the one-way clutch is set so that the rotational resistance produced by the rotational resistance imparting means 9 acts on the large-diameter retainer 3. The sprags 5 are thus inclined to an engageable position shown in FIG. 5.

In contrast, when the vehicle moves forward, the one-way clutch 8 does not operate, so that the large-diameter retainer 3 disengages from the rotational resistance imparting means 9. Thus, the large-diameter retainer 3 is delayed in the opposite direction because only the rotational resistance by the switch spring 7 is applied thereto. The sprags 5 will thus move to a forward-travel engageable position.

In this state, while the vehicle is moving straight, the rear wheels as the main driven wheels slip slightly, so that the inner member 2 rotates faster than the outer ring 1, thereby engaging the sprags 5. The driving force is thus transmitted to the front wheels and the vehicle is driven on four wheels.

When the vehicle is turning with a certain steering angle, the front wheels rotate faster than the rear wheels, so that the outer ring 1 will overrun the sprags 5, releasing the sprags 5. Thus, no braking phenomenon will occur while the vehicle is turning a tight corner.

In this rotation transmission device, in a normal travelling, it is necessary to change over the driving mode between four-wheel drive and two-wheel drive by selectively transmitting and cutting off a turning torque to the front wheels. Thus, the outer ring 1 and inner member 2 are disconnected from each other. In this state, the solenoid 15 need not be activated.

Namely, the solenoid 15 is turned off and the presser member 24 is biased by the elastic member 30 to a position where the brush 25 and the slip ring 21 are not in contact with each other (FIG. 1).

Figure 3:
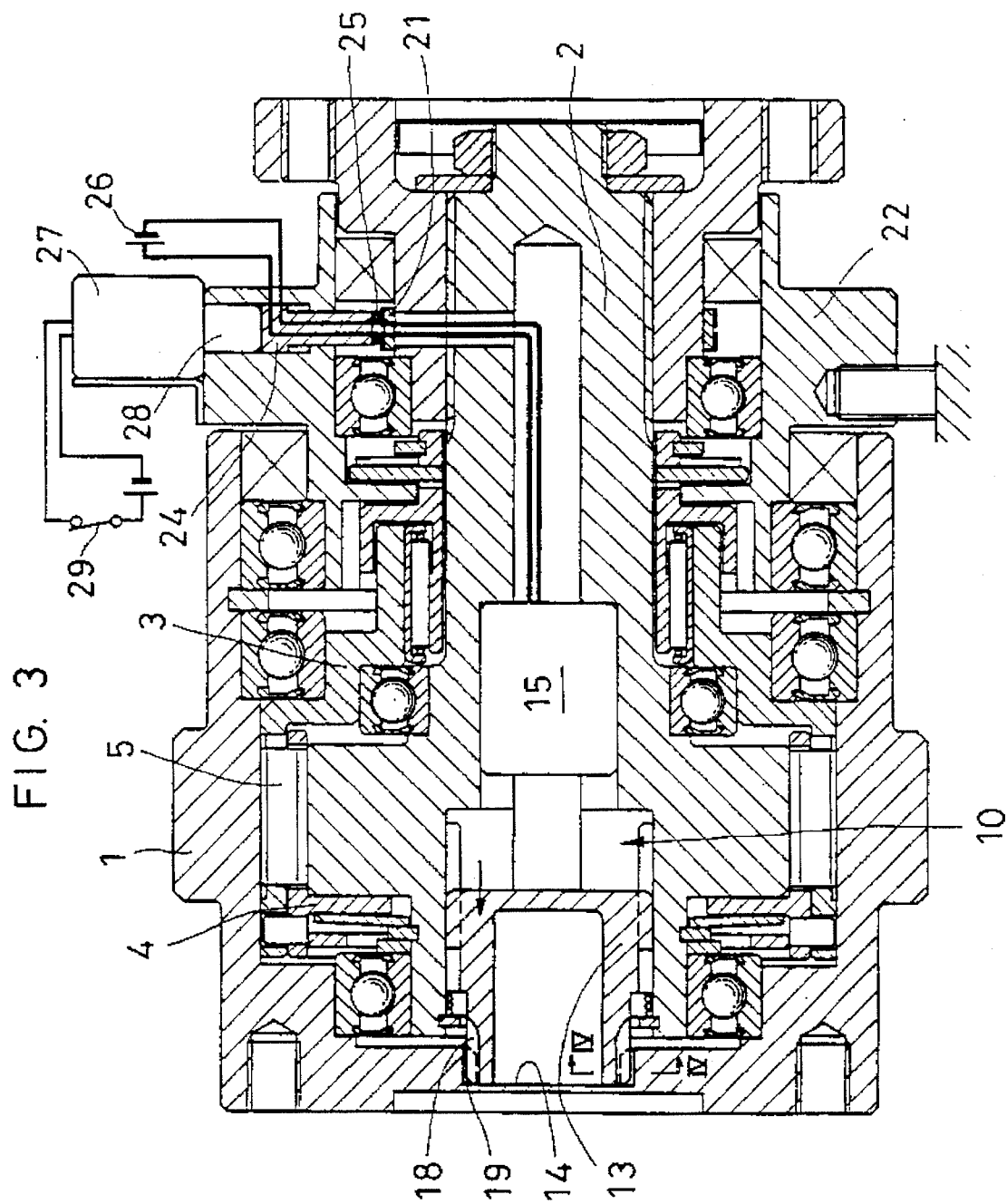
FIG. 3 is a sectional view of the same showing how it operates.

On the other hand, when a sufficiently large engine brake is needed, such as when the vehicle is going down a long slope, the switch 29 of the external solenoid 27 is turned on to move the presser member 24 down and bring the brush 25 into sliding contact with the slip ring 21. The internal solenoid 15 is thus turned on, so that as shown in FIGS. 3 and 4, the coupling member 13 is moved toward the bottom hole 14 of the outer ring 1 until the engaging teeth 18 and 19 mesh with each other. In this state, the outer ring 1 and inner member 2 are coupled together, with the sprags 5 kept inoperative, so that all four wheels are coupled to the driving system. Thus, torque is transmitted from the front wheels to the driving system. In other words, the engine brake is applied to both front and rear wheels, so that the braking force increases as a whole.

In this embodiment, since the brush 25 and the slip ring 21 are brought into sliding contact with each other only when necessary and otherwise kept out of contact with each other, their contact portions are worn little and thus their durability is high.

FIGS. 7 to 12 show the second embodiment.

In this embodiment, in contrast to the first embodiment, the outer ring 1 is used as the driving member and the inner member 2 as the driven member. Between the inner member 2' and the small-diameter retainer 4 is mounted a coupling means 31 for connecting and disconnecting them.

Figure 7:
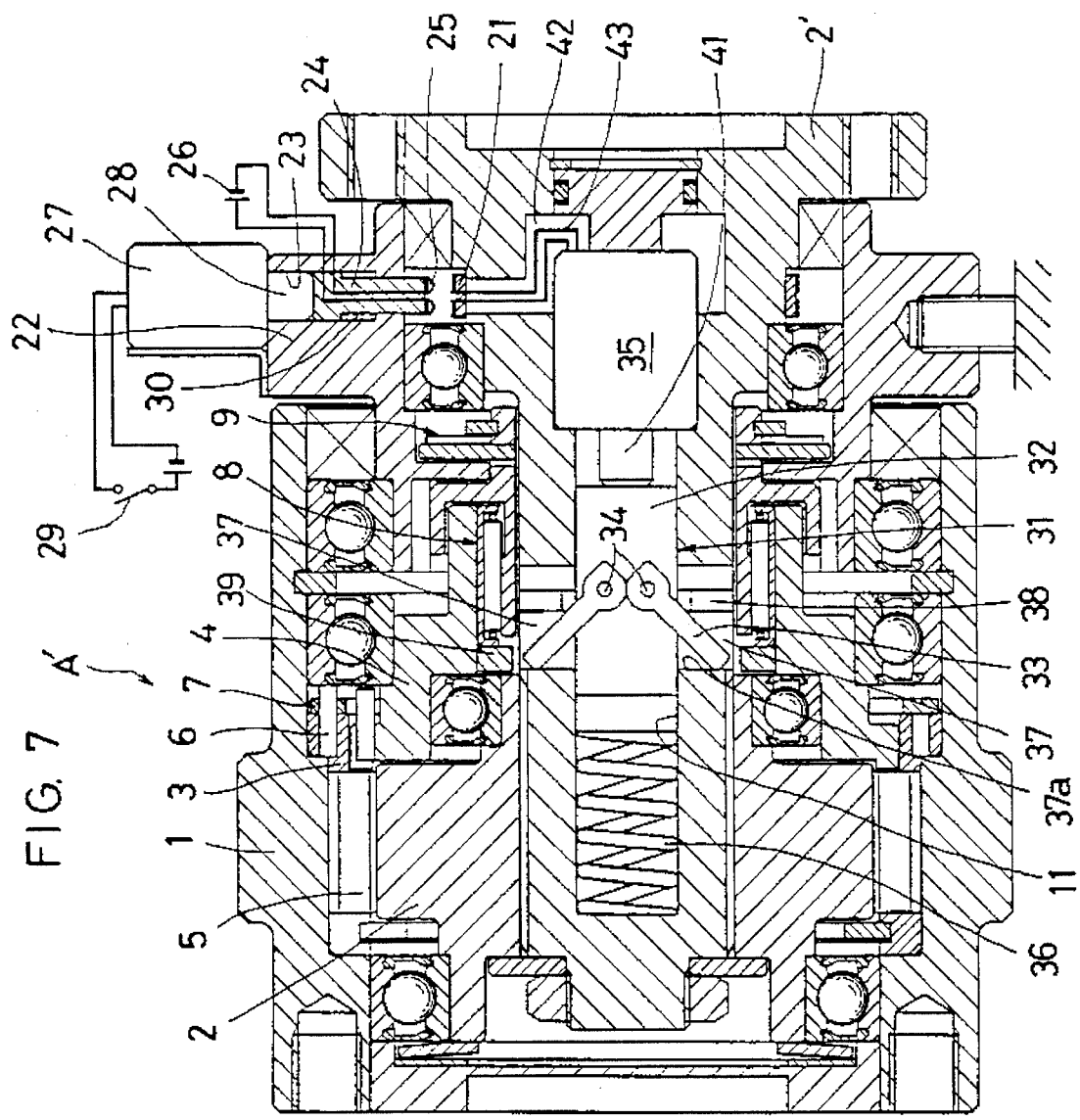
FIG. 7 is a vertical sectional front view of a second embodiment.
Figure 8A:
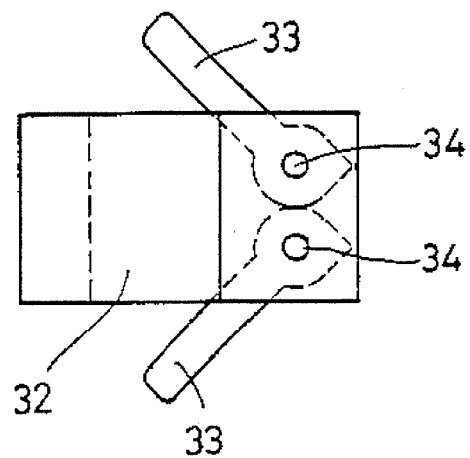
FIG. 8A is a front view of the coupling pieces and the support member.
Figure 8B:
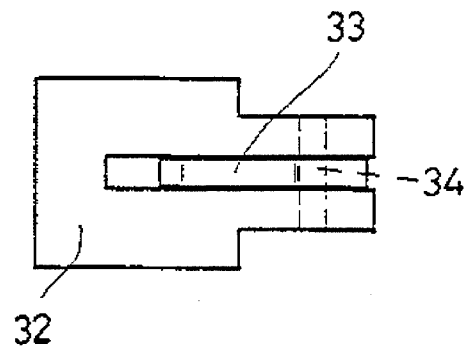
FIG. 8B is their plan view.

As shown in FIGS. 7 and 8, this coupling means 31 comprises a support member 32 axially movably mounted in a bore 11 formed in the inner member 2', and a pair of outwardly pivotable coupling pieces 33 mounted to the support member 32 through pins 34. A solenoid 35 is mounted in the bore 11 near its opening to move the coupling pieces 33 and the support member 32 in one direction. A spring 36 is mounted in the bore 11 at its deep end to bias the support member 32 toward the solenoid 35.

Figure 9:
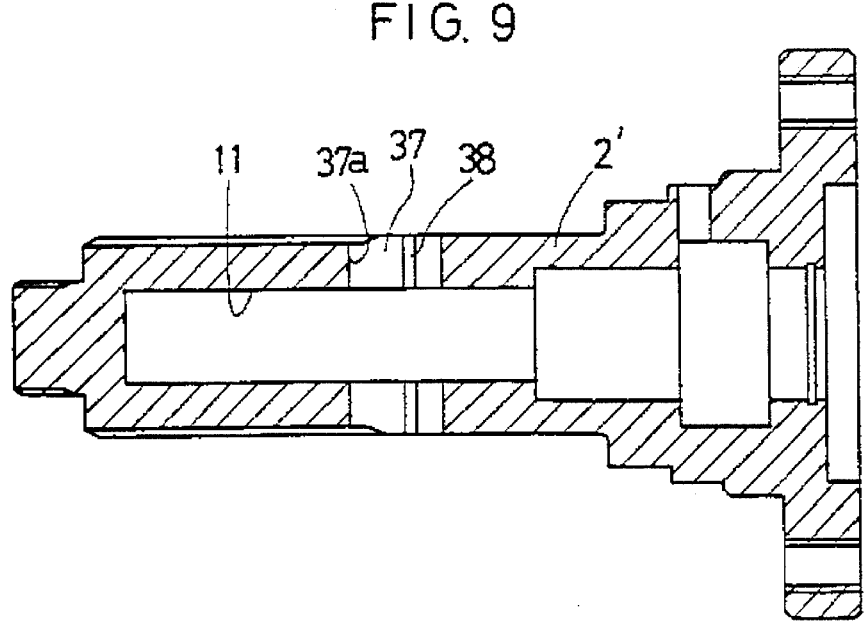
FIG. 9 is a sectional view of the inner member of the same.
Figure 10:
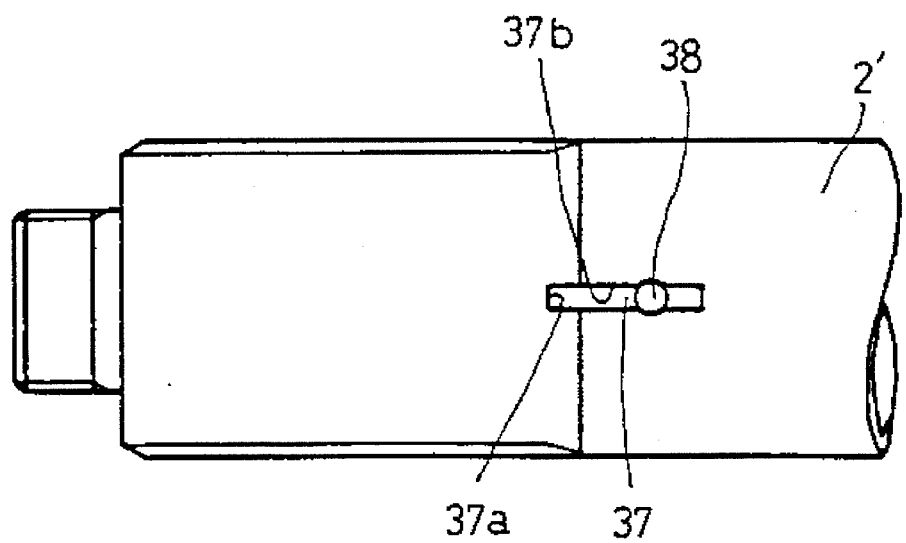
FIG. 10 is a partial plan view of the inner member.

As shown in FIGS. 7 and 9, in the peripheral surface of the bore 11 are formed diametrically opposite windows 37 through which the coupling pieces 33 are spreadable. The engaging pieces 33 have their respective tips kept in contact with the end walls 37a of the windows 37 when they are closed as shown in FIG. 7. By stretching the actuator arm 41 of the solenoid 35 from this state, the coupling pieces 33 will spread apart while keeping their tips moving along the walls 37a to the position shown in FIG. 12.

Stopper pins 38 are provided in the respective windows 37 to prevent the coupling pieces 33 from protruding outwardly from the inner member 2' due to a centrifugal force when the support member 32 is in its rearward position.

Figure 11:
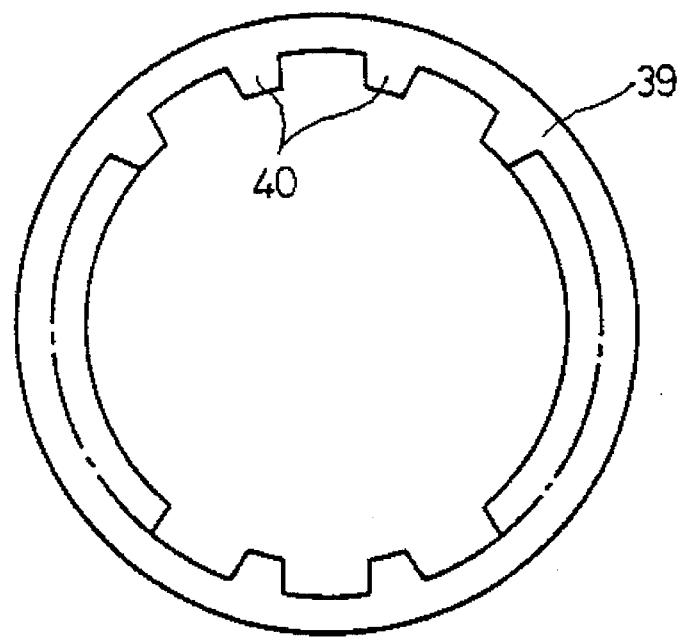
FIG. 11 is a front view of the engaging ring.
Figure 12:
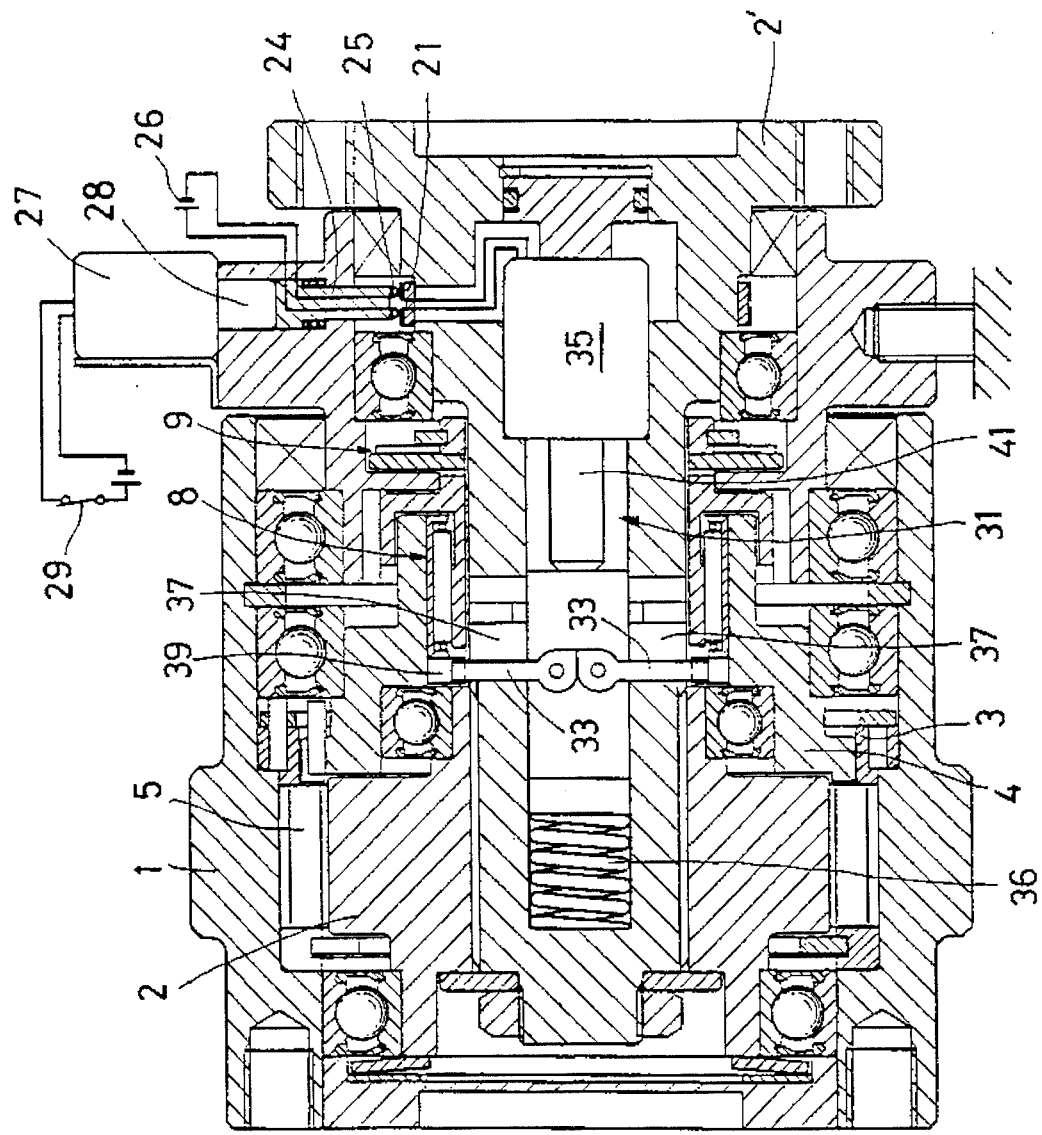
FIG. 12 is a sectional view similar to FIG. 7 but showing a different operational state.

An engaging ring 39 is press-fitted onto the inner peripheral surface of small-diameter retainer 4. As shown in FIG. 11, it is provided on the inner peripheral surface thereof with a plurality of engaging teeth 40 adapted to mesh with the tips of the coupling pieces 33 when they are spread apart. In this arrangement, the inner member 2 and the small-diameter retainer 4 are coupled together by the engagement of the coupling pieces 33 with the engaging teeth 40 and with the circumferential side walls 37b of the windows 37.

As shown in FIG. 7, in the rear end of the inner member 2' is formed a passage 42 extending from the outer periphery of the inner member 2 and communicating with the bore 11. Lead wires 43 extend from the solenoid 35 through the passage 42 and connected to a slip ring 21 mounted on the outer periphery of the inner member 2'.

Similar to the first embodiment, the housing 22 fixed to the vehicle body is formed with a radial hole 23 in which is fitted a presser member 24 movable toward and away from the slip ring 21. A brush 25 is mounted to the tip of the presser member 24 and connected to a DC power supply 26 such as a battery.

Also fitted in the hole 23 is an actuator shaft 28 of an external solenoid 27. By turning on a switch 29 of the power circuit of the external solenoid 27, the actuator shaft 28 is stretched until the presser member 24 comes into contact with the slip ring 21. In contrast, when the actuator shaft 28 of the external solenoid 27 retracts, the presser member 24 will move outward biased by an elastic member 30, separating the brush 25 and the slip ring 21 from each other.

Figure 13:
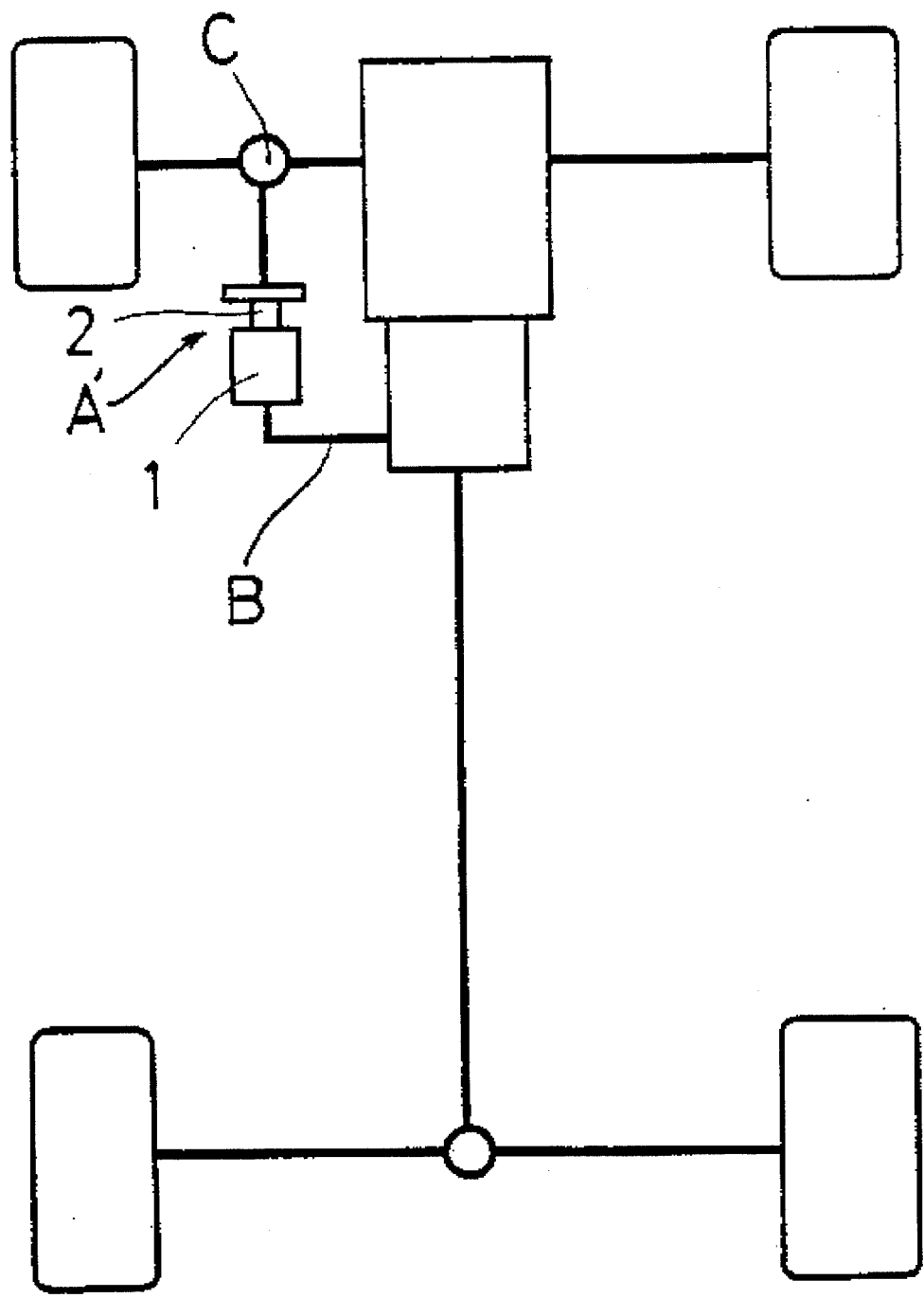
FIG. 13 is a diagrammatic view showing the same as mounted on the driving system of a vehicle.
Figure 14:
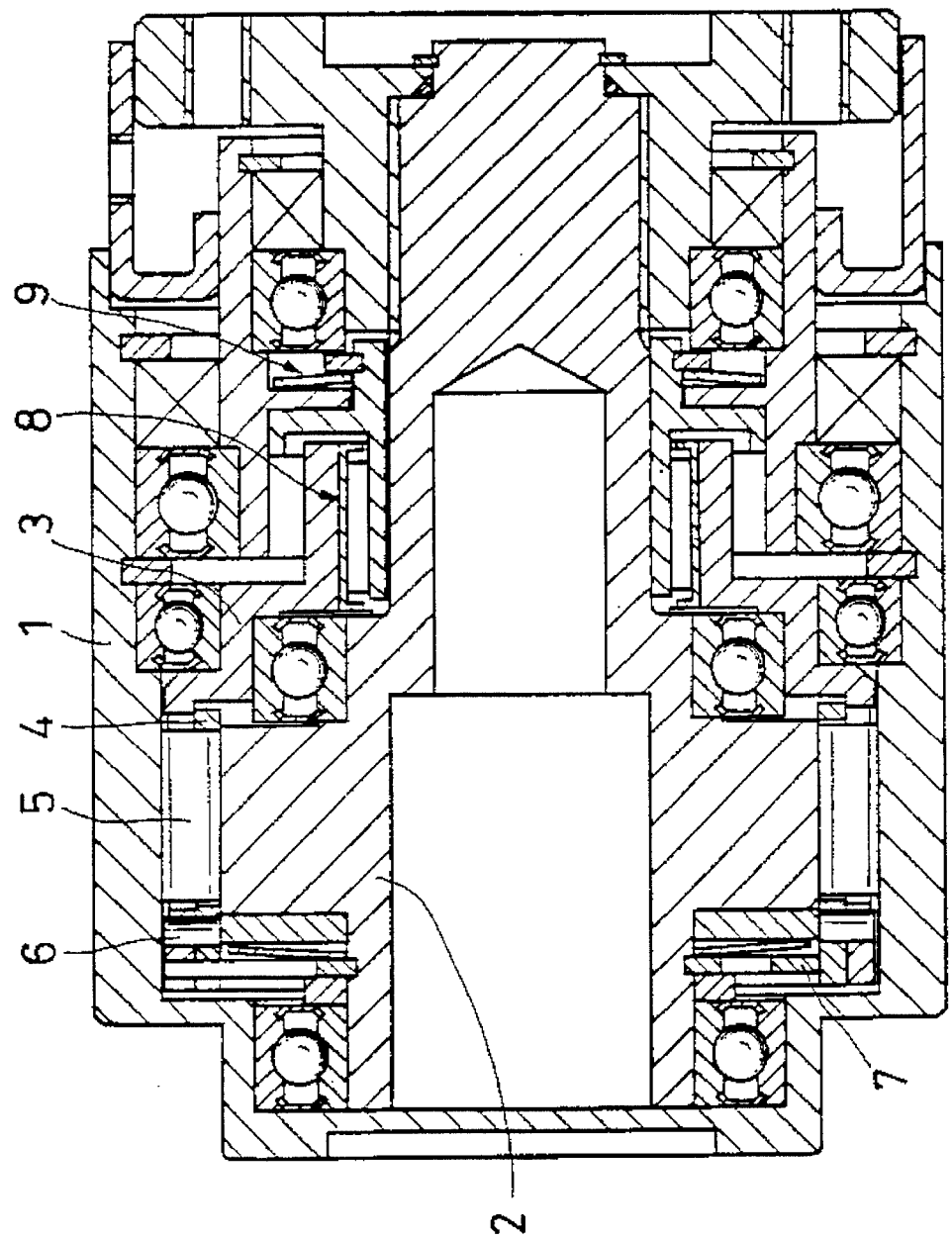
FIG. 14 is a vertical sectional front view of a conventional device.
Figure 15:
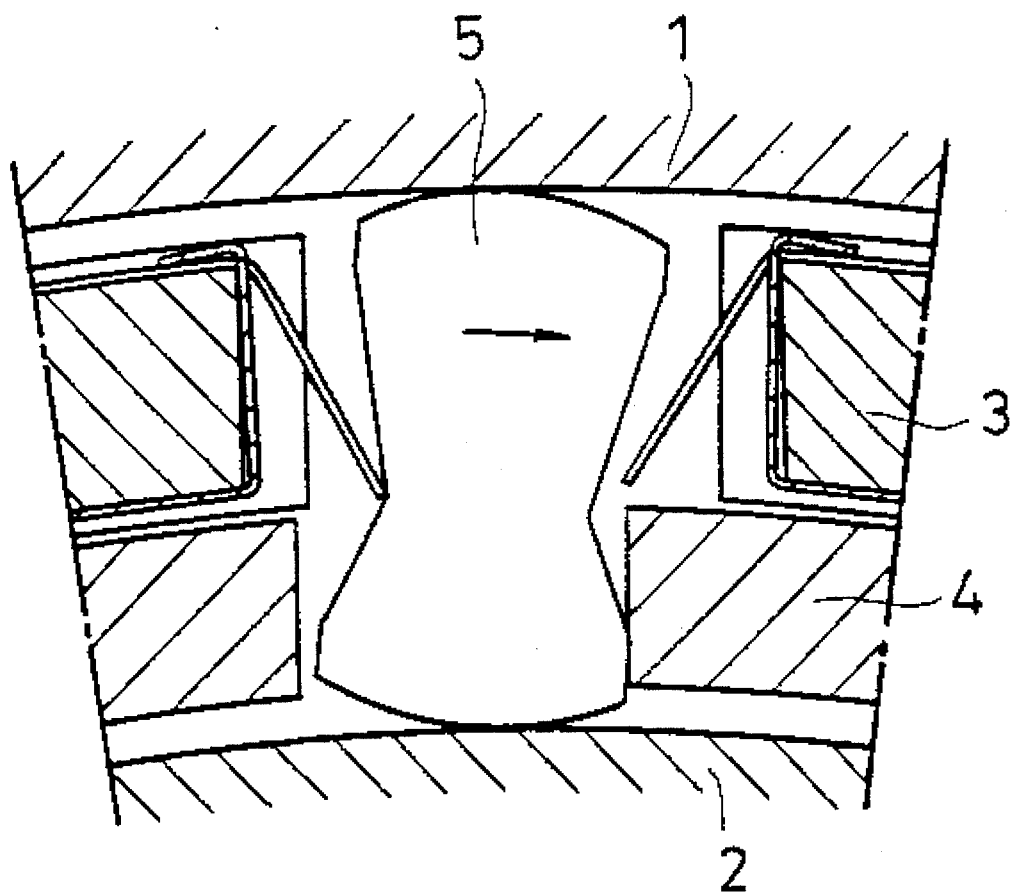
FIG. 15 is a sectional view of the clutch mechanism of the same.

As shown in FIG. 13, this rotation transmission device A' of the second embodiment is mounted on a four-wheel drive vehicle by connecting the outer ring 1 to the front wheel propeller shaft B and the inner member 2 to the front differential C. In a normal travelling, it is necessary to change over the driving mode between four-wheel drive and two-wheel drive by selectively transmitting and cutting off the turning torque to the front wheels. Thus, the outer ring 1 and the inner member 2 are disconnected from each other by turning off the internal solenoid 35.

On the other hand, when a sufficiently large engine brake is needed, such as when the vehicle is going down a long slope, the external solenoid 27 is turned on to move the presser member 24 and bring the brush 25 into sliding contact with the slip ring 21. The internal solenoid 15 is thus turned on, so that the support member 32 is moved toward the deep end of the bore 11 until the coupling pieces 33 are spread apart and mesh with the engaging teeth 40 on the engaging ring 39. Now, the inner member 2' and the small-diameter retainer 4 are coupled together.

When the inner member 2' and the small-diameter retainer 4 are coupled together, the small-diameter retainer 4 is rotated together with the inner member 2 irrespective of whether the inner member 2 is rotating in one or the other direction. The sprags 5 will thus incline in one direction and engage, thereby coupling the inner member 2 and the outer ring 1 together. All four wheels are now coupled to the driving system, so that torque is transmitted from the front wheels to the driving system. In other words, the engine brake acts on both front and rear wheels.

In both embodiments, the sprags used as engaging elements are engageable when inclined in either direction. But, sprags each engageable only when inclined in one of the opposite directions may be mounted between the outer ring 1 and the inner member 2 so that the adjacent sprags are arranged symmetrically, i.e. in opposite ways to each other.

Also, the engaging elements may be rollers instead of sprags. In this case, engaging surfaces engageable with the rollers are formed on the opposite surfaces of the outer ring and the inner member.

What is claimed is:

1. A rotation transmission device comprising a driving member and a driven member rotatably mounted one around the other, a plurality of engaging elements disposed between said driving member and said driven member and adapted to engage said driving member and said driven member to couple them together when they rotate in either direction, a first retainer and a second retainer mounted between said driving member and said driven member for keeping said engaging elements circumferentially spaced apart by a predetermined distance from one another, said first retainer and said driving member being coupled together so as to be rotatable relative to each other with a play left therebetween, said second retainer having a bent portion radially extending and being coupled to said driving member through said bent portion so that said second retainer and said driving member will rotate relative to each other when a predetermined torque is applied to said second retainer, said first retainer and said second retainer being formed with a plurality of pockets to receive said engaging elements, a turning effort imparting means provided between said first retainer and said second retainer for imparting to said first retainer a turning effort in one direction, a rotation resistance imparting means for applying a force resisting the rotation of said first retainer in said one direction, said first retainer having an extension portion, a one-way clutch provided between said first retainer and said rotation resistance imparting means at said extension portion for turning on and off the coupling therebetween, said rotation resistance produced by said rotation resistance imparting means being set to be larger than the turning effort produced by said turning effort imparting means, and a coupling means for selectively coupling and disconnecting said driven member to and from said driving member.

2. A rotation transmission device as claimed in claim 1, wherein said engaging elements are sprags.

3. A rotation transmission device as claimed in claim 1 wherein said coupling means comprises a coupling member for coupling and separating said one member and said driven member, and a solenoid for moving said coupling member to said operative position to coupled said one member and said driven member together.

4. A rotation transmission device as claimed in claim 3, wherein a slip ring is connected to said solenoid, and wherein said rotation transmission device further comprises a contact connected to an external power supply and mounted so as to be movable toward and away from said slip ring.

5. A rotation transmission device comprising a driving member and a driven member rotatably mounted one around the other, a plurality of engaging elements disposed between said driving member and said driven member and adapted to engage said driving member and said driven member to couple them together when they rotate in either direction, a retainer member mounted between said driving member and said driven member for keeping said engaging elements circumferentially spaced apart by a predetermined distance from one another, said retainer member and said driving member being coupled together so as to be rotatable relative to each other with a play left therebetween, a turning effort imparting means for imparting to said retainer member a turning effort in one direction, a rotation resistance imparting means for applying a force resisting the rotation of said retainer member in said one direction, a one-way clutch provided between said retainer member and said rotation resistance imparting means for turning on and off the coupling therebetween, said rotation resistance force produced by said rotation resistance imparting means being set to be larger than the turning effort produced by said turning effort imparting means, and a coupling means for selectively coupling and disconnecting said driven member to and from said retainer member.

6. A rotation transmission device as claimed in claim 5 wherein said coupling means comprises a coupling member for coupling and separating said one member and said driven member, and a solenoid for moving said coupling member to said operative position to coupled said one member and said driven member together.

7. A rotation transmission device as claimed in claim 6, wherein a slip ring is connected to said solenoid, and wherein said rotation transmission device further comprises a contact connected to an external power supply and mounted so as to be movable toward and away from said slip ring.

\* \* \* \* \*